United States Patent [19]
Custer

[11] 3,981,445
[45] Sept. 21, 1976

[54] VARIABLE VOLUME AIR WALL

[76] Inventor: Warren L. Custer, R.D. No. 3, Box 205D, Ligonier, Pa. 15658

[22] Filed: May 23, 1975

[21] Appl. No.: 580,247

[52] U.S. Cl. .............................. 237/1 A; 126/270; 98/31; 98/95; 98/96; 165/53; 165/56
[51] Int. Cl.² ............................................ F24J 3/02
[58] Field of Search ............... 98/95, 96, 31, 33 A; 237/1 A; 126/270, 271; 52/303, 304, 198; 165/53, 56

[56] References Cited
UNITED STATES PATENTS

| | | | |
|---|---|---|---|
| 1,467,005 | 9/1923 | Lawrence | 237/1 A |
| 2,484,127 | 10/1949 | Stelzer | 126/270 |
| 2,559,869 | 7/1951 | Gay | 126/270 |
| 2,559,870 | 7/1951 | Gay | 126/270 |
| 2,559,871 | 7/1951 | Gay | 126/270 |
| 2,605,516 | 8/1952 | Gugliotta | 52/304 |
| 2,645,824 | 7/1953 | Titsworth | 52/303 |
| 2,680,437 | 6/1954 | Miller | 126/270 |
| 3,048,375 | 8/1962 | Walker | 126/270 |
| 3,107,052 | 10/1963 | Garrison | 237/1 |
| 3,793,931 | 2/1974 | Wild | 98/95 |

OTHER PUBLICATIONS
B512,745, Jan. 1976, Deminet et al. 126/271.

*Primary Examiner*—John J. Camby
*Assistant Examiner*—Henry C. Yuen
*Attorney, Agent, or Firm*—Sidney W. Millard

[57] ABSTRACT

A temperature modifying system for a building having windows, some of which are exposed to the direct rays of the sun and some of which are not. The system includes a plurality of double paned windows, a heat exchange unit, an air ducting system interconnecting the windows and heat exchange unit, and an air handling unit for forcing air through the ducting system. The air moves sequentially through the heat exchange unit, the air handling unit, the ducting to the windows, through the double paned windows and back through ducting to the heat exchange unit. Each window includes parallel transparent panels spaced apart in a conventional manner, but including apertures for the entrance and exit of air conducted through the system. Light and heat reflecting slat means are mounted between the parallel panels to reflect outwardly the radiant heat from the sun. A temperature sensing device is mounted to measure the temperature of the air exiting from each active window unit. The temperature sensing device is connected with apparatus to regulate valving structure which controls the volume of air admitted to the window enclosure between the panels, i.e., with an increase in temperature the valving structure will move to increase the volume of air passing into the enclosure and thereby remove more heat from the enclosure to reduce the temperature of the exiting air.

7 Claims, 3 Drawing Figures

VARIABLE VOLUME AIR WALL

BACKGROUND AND BRIEF DESCRIPTION OF THE INVENTION

Room or building cooling units of innumerable variation are well known in the industry, but there is always a need for an improved efficiency in the system to reduce the consumption of energy while still achieving the desired results. This invention is concerned with improving the efficiency of conventional heating and-/or cooling systems by the application of some unique technology. The intent is to provide zones at the exterior building walls having substantially equal temperatures (on all sides of the building) and thus minimize the solar effect on the building interior.

Although the invention herein did not result from a knowledge of the patent to Wild, U.S. Pat. No. 3,793,931, dated Feb. 26, 1974, it would have to be considered an improvement over the Wild disclosure. The disclosure of Wild includes passing air from inside an air conditioned room into an enclosure bounded by double window panes of a conventional window. The air is calculated to flow from the room downward into the space between the window panes to about floor level where the air is exhausted to the outside. Mounted between the window panes is an adjustable heat and light deflecting collection of slats, an example of which is the conventional Venetian blind.

To understand the improvement desclosed herein it can probably be best illustrated by considering the progress of the sun in its traverse of the sky during the daylight hours and its effect on a building being cooled. Rooms within the building are conventionally cooled by some type of air handling apparatus but this fact bears no direct relationship to the inventive concept herein, although the cool air used by the room cooling system could also be used in the wall cooling system (which is part of the inventive concept). The wall cooling system includes cooled (or heated) air which is pumped between the double panes of the exterior windows of the building. This will be explained in more detail subsequently. But, to understand the reason for what is being done consider for example, the position of the sun in the early morning after the building is occupied. The interior spaces adjacent to the exterior walls on the east and south side of the building will be heated due to the warm up of the exterior walls as the result of the impingement of the sun, thus creating a transmission of heat energy from the sun's rays to the interior spaces. The interior spaces will further be heated as a result of the direct rays of the sun entering the windows on these sides of the building. At the same time, at the north and west sides of the building, there will be no major contribution of heat from the sun's rays to the internal spaces. Consequently, there is a need for greater heat removal at this particular time of day from the south and east sides of the building than there is from the north and west sides in order to maintain rather stable space temperatures within the building.

As the earth rotates through the day into afternoon, the sun's rays are impinged on the south and west walls of the building, while the north and east walls are in shadow. In this instance, the south and west walls will require more heat to be removed than will the shadowed sides. In fact, one could easily have an instance where cooling would be required on one or two sides of the building and heating would be required on the shadowed sides due primarily to the effect of the sun's rays impinged on certain surfaces of the building. The heat removal requirement will vary as the sun moves through its path during the day, thus causing a change in building conditions as it moves across the sky from morning to evening.

This invention has devised a mechanism for temperature control by the technique of measuring the temperature of the exit air from the double paned windows and controlling the volume of cooled or heated air conducted through each window unit in response to the measured temperature of the exiting air which will be in direct relationship to the quantity of energy dissipated by the sun's rays.

DESCRIPTION OF THE PREFERRED EMBODIMENT

Figure 1:
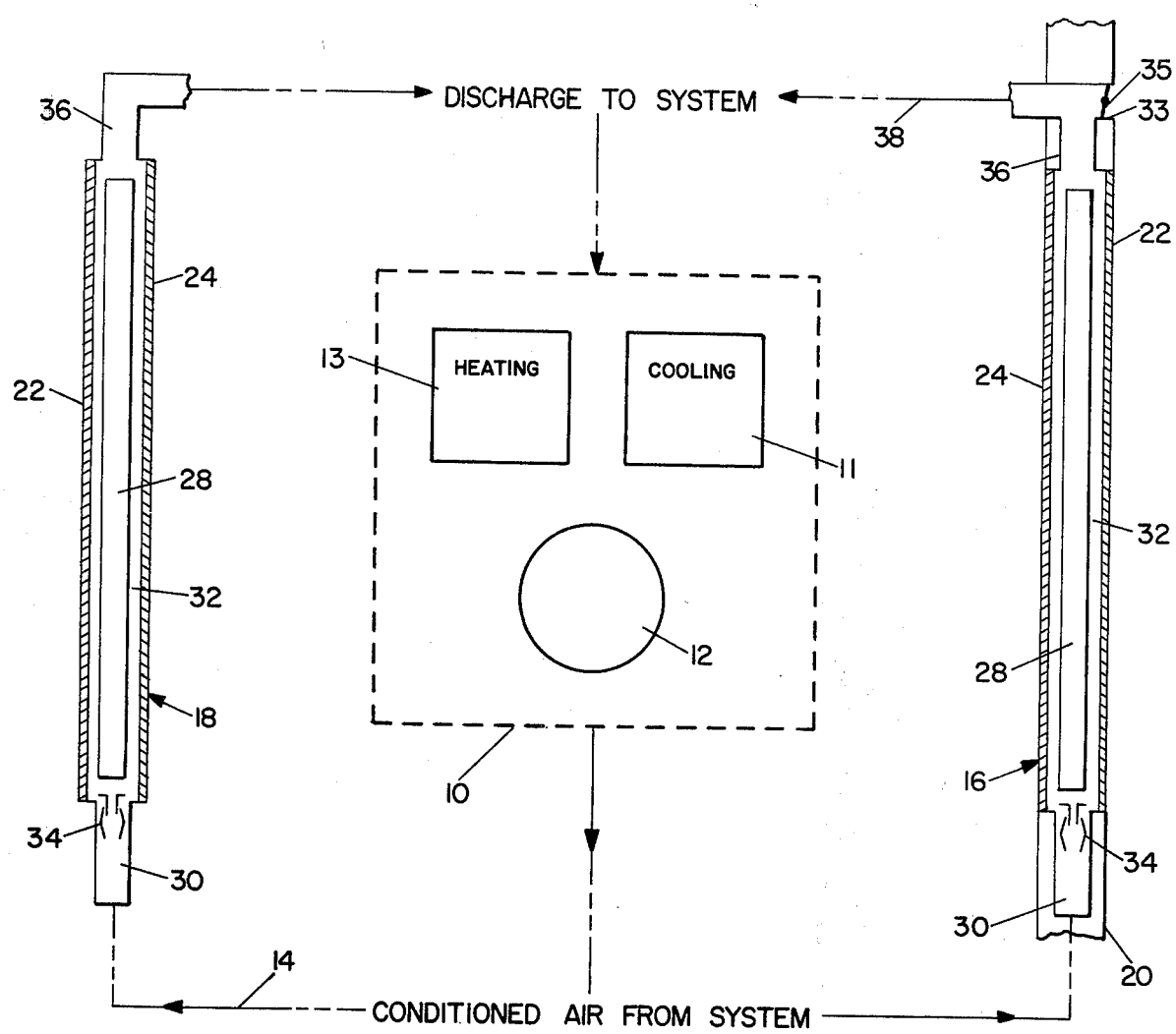
FIG. 1 is a schematic illustration of an air heating, cooling and air handling unit and circulation system within a building including ducting and two windows, symbolically, the windows being on opposite sides of the building.

Referring to FIG. 1, air is conducted from the heat exchange or air conditioning unit 10 by a blower pump or other means 12 for forcing air through ducting 14 to windows 16 and 18. While the disclosure which follows is primarily concerned with a cooling system, the invention is equally applicable to a heating system or an integrated system for simultaneous heating and cooling of diverse parts of the building. The physical arrangement of the cooling unit 11 and the heating unit 13 is optional and well within the skill of the art.

Windows 16 and 18 are merely illustrative of numerous windows which might be mounted in the exterior walls 20 of any building, but for an understanding of the invention, the two windows 16 and 18 are adequate. For the purpose of this discussion consider the window 16 to be on the west side of the building and the window 18 to be on the east side of the building.

Each window includes an outside pane of glass or panel 22 and a similar inside panel 24. Both panels are mounted in a relatively airtight frame 26. A series of mechanically coordinated slats 28, such as are conventional in Venetian blind type structures, are mounted between the two glass panels 22, 24. The slats may be adjusted automatically or mechanically to minimize the direct passage of sunlight (and radiant heat) into the building. Similarly, the slats could be stationary if desired.

Figure 3:
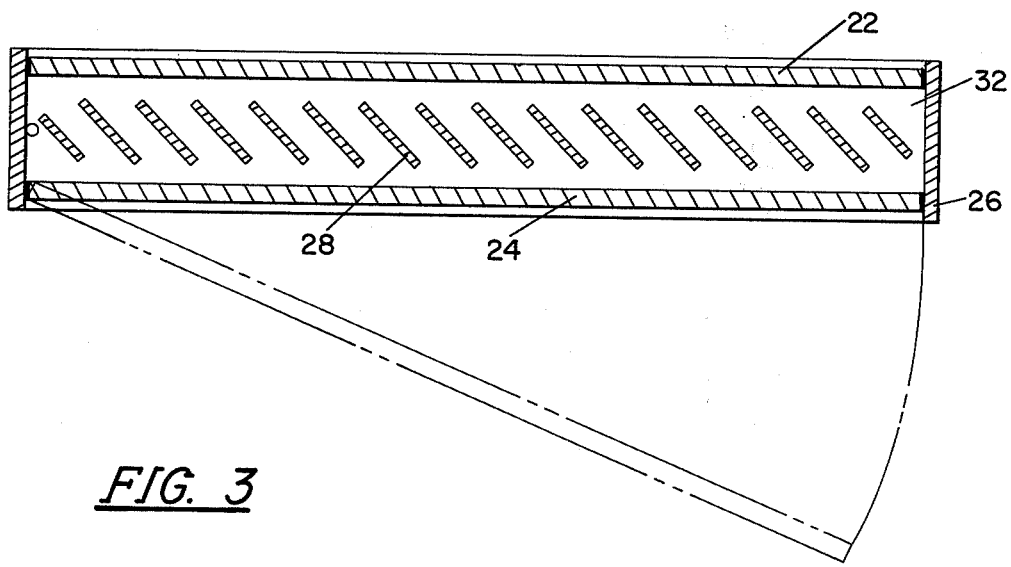
FIG. 3 is a sectional view taken along line 3—3 of FIG. 2 and illustrating an opening of the window in phantom.

Observing FIG. 3 it will be noted that the inside glass panel 24 is designed to pivot to a position where the slats 28 may be removed or cleaned as needed. The pivoting is illustrated in phantom. While the slats are shown in vertical alignment they could be disposed horizontally without departing from the inventive concept.

Figure 2:
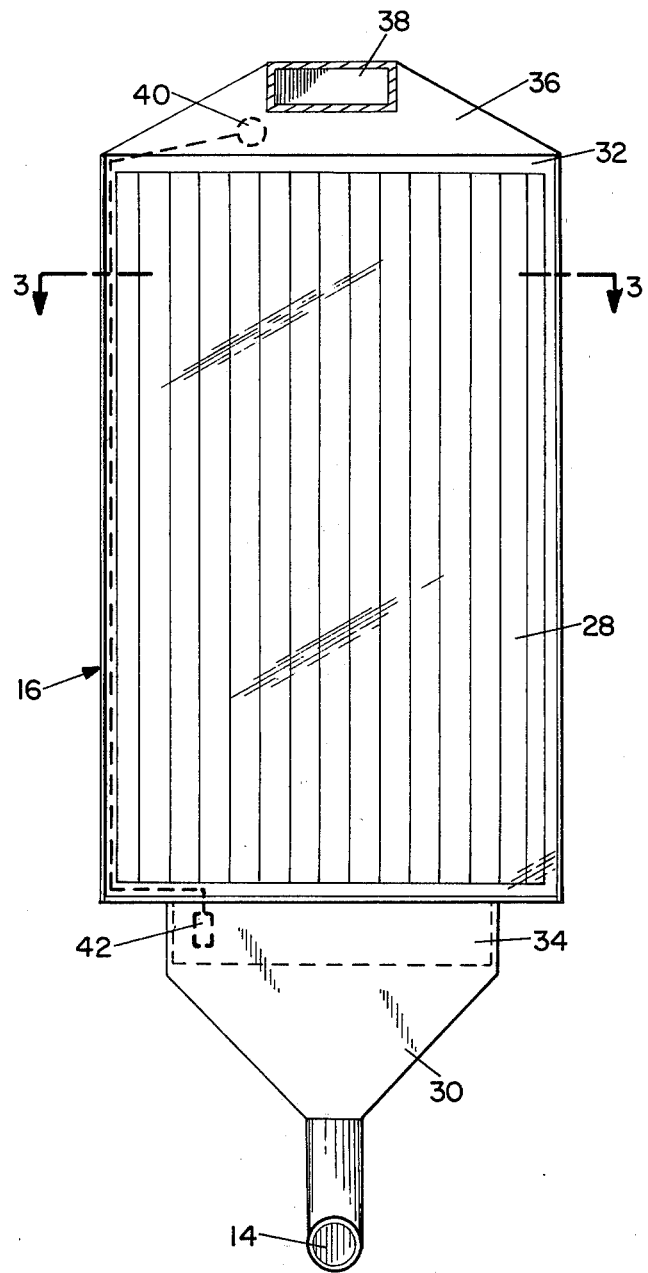
FIG. 2 is an elevational view of one of the windows illustrated in FIG. 1.

FIG. 2 illustrates a window 16 in elevational view showing the ducting 14 conducting air to a plenum chamber 30 and subsequently to the enclosure 32 formed by the panels 22 and 24 and the frame 26. A modulating device 34 including adjustable valving structure is mounted at the ingress of the enclosure 32 to control the volume of air admitted to the enclosure. The way the volume is regulated will be explained subsequently.

While ducting 14 and 38 is illustrated as direct line connection, it is clear that each "duct" could be a plenum chamber or the like. The ducting of the drawing is merely illustrative of one way to conduct the cool air to and from the window. As one example, a vent 33 to the outside may be opened by butterfly valve 35 and air for cooling unit 11 may be drawn from the outside.

Air flowing into the enclosure will be cooler than the outside window panel 22, the slats or solar collectors 28 and perhaps even cooler than the inside panel 24. Thus, in its upward movement through the enclosure 32 the air will absorb heat from the slats and transparent panels. Upward movement of the air is clearly optional, the window could be inverted and the direction of the flow reversed if desired.

Having collected a certain amount of heat within the enclosure 32, the air will exit at the top into an air collector 36 and it will flow into outlet ducting 38 (or to a plenum chamber or the like) and back to the air cooling or heating unit 10. A temperature sensing device 40 is mounted in the collection chamber 36 adjacent the outlet or egress of the enclosure 32. The temperature measuring device 40 may be of any conventional design for the purpose described. Its purpose is to sense the temperature of the outlet air from the window enclosure and to convey this information to the modulating device and an air volume control 42 which is temperature responsive. Specifically, the air volume control device 42 is designed to increase the flow of air into the enclosure 32 upon an increase of temperature signaled by the device 40 whereas, a decrease in the temperature at 40 will cause a corresponding decrease in the volume of air to the enclosure.

In this invention the air handler 12 is under substantially constant load and where the valving below window 18 is fully open and the valving below window 16 is only one-half open the volume of air through window 18 will exceed the volume through window 16. The need for increased or decreased volumes of air is dictated by the temperature of the air exiting from each window or perhaps one window on each floor on each side of the building or some other convenient active working window unit. Even though the blower load is constant the compressor load on the cooling or heating unit will vary throughout the day in relation to the temperature of the return air from the windows.

In operation, the central control system of the building will be set by hand or by some preprogrammed apparatus and the temperature sensing devices 40 of windows 16 and 18 will be designed to operate independently but in response to the same temperature setting. For example, the mechanism might be set to have the valving fully open at 100°F while decreasing the volume until the valving would be fully closed at 75°F. Illustratively, at 11 o'clock in the morning the window 18 on the east side will be receiving direct radiant heat from the sun while the window 16 on the west side will be in the shade. Consequently, the heat to be removed from window 18 will be greater than the heat to be removed from window 16. Thus, the volume control device 42 for the window 18 will have opened the valving structure of the modulating device 34 whereby a greater volume of air will flow through the window 18 than will flow through the window 16. The intention is to have the air arriving at each temperature sensing device 40 be at the same temperature. In other words, the volume control device 42 on the window 18 will continue to open the valving structure of the modulating device 34 and continue to increase the volume of air through the window 18 until such time as the air flowing past the temperature sensing devices 40 of both windows 16 and 18 is at the same temperature. Obviously, a greater flow is required on the side of the building receiving the direct rays of the sun, but with substantially equal exit temperatures, there will be substantially equal temperature gradients in all window panels 24 and thereby a substantially constant radiant heat throughout the building (since heat radiation is directly proportional to the surface temperature of the radiating surface).

It should be clear that there is a substantial savings in energy here because the heat removed from the sun side of the building does not require a corresponding volume of flow of cool air to the shaded side of the building. Similarly, this is not a cooling system where the unit is either off or on as one may think of it in a traditional single family dwelling where the thermostat is set to a temperature at which the refrigeration unit and blower are actuated and when a specific lower temperature is reached the units are switched off. In this case the blower system will operate continually or until some system or manual operation irrelevant to this invention is actuated or deactivated. What this system does is equalize the temperature throughout the building at the inside wall area in a system by the regulation of flow of cool air to the hottest parts of the building, namely, the windows.

Having thus described the preferred embodiment in some detail it will be clear to those having ordinary skill in the art that obvious modifications could be made to the system without departing from the spirit of the invention. Such obvious modifications are within the inventive concept. It is not intended that the words used to describe the invention nor the drawings be limiting on the invention, rather the only limitations placed are those in the appended claims.

I claim:

1. A temperature modifying system primarily for the periphery of a building including the combination of a heat exchange unit, ducting means, at least two windows and means for forcing air through the unit, ducting means and windows, the ducting means being for sequentially conducting air to the heat exchange unit, the air forcing means and the windows, said ducting means being connected to each of said windows such that air from said heat exchange unit passes through only one window prior to its return to the heat exchange unit, the windows being located in window openings in the building, at least one window being exposed to direct radiant heat from the sun and at least one other being shaded from the sun, each window including parallel transparent panels spaced apart by means forming a substantially fluid tight enclosure with said panels, said enclosure means including aperture means at its bottom and top for ingress and egress of air from the ducting means, one said panel being exposed to air outside the building and the other said panel being exposed to air inside the building,
aligned slat means mounted between said parallel panels for absorbing and reflecting radiant heat,
separate volume control means for the shaded window and exposed window for regulating the volume of air passing into the enclosures such that the exit temperatures of the air from the enclosures are substantially equal,
a temperature sensing device near the point of egress of the air of each said windows, said temperature sensing device being operatively connected to means for modifying the size of the ingress aperture, said modifying means increasing the size of the ingress aperture when the temperature sensing device senses an increase in temperature of the air exiting the enclosure.

2. The system of claim 1 wherein the air moves from the bottom to the top within the enclosure.

3. The system of claim 2 wherein the panel exposed to the inside of the building is movable with respect to the remainder of the enclosure to allow the exposure of the slat means for cleaning or removal.

4. The system of claim 3 including valve means for venting the air exiting the enclosure to the building exterior.

5. The system of claim 2 including valve means for venting the air exiting the enclosure to the building exterior.

6. The system of claim 1 including valve means for venting the air exiting the enclosure to the building exterior.

7. The system of claim 1 wherein the panel exposed to the inside of the building is movable with respect to the remainder of the enclosure to allow the exposure of the slat means for cleaning or removal.

* * * * *